United States Patent [19]

Kindelan

[11] 3,746,459

[45] July 17, 1973

[54] APPARATUS FOR DRILLING ESCAPE AND VENT HOLES IN DIE MOLDS

[75] Inventor: James J. Kindelan, Greensburg, Pa.

[73] Assignee: Overmyer Mould Company of Pennsylvania, Greensburg, Pa.

[22] Filed: Mar. 24, 1971

[21] Appl. No.: 127,496

[52] U.S. Cl. .................... 408/37, 408/39, 408/89
[51] Int. Cl. ........................................... B23b 41/00
[58] Field of Search ................ 408/37, 39, 89, 130; 29/568

[56] References Cited
UNITED STATES PATENTS

| 754,321 | 3/1904 | Koeppen | 408/37 |
| 3,281,935 | 11/1966 | Zankl et al | 29/568 |
| 2,651,975 | 9/1953 | Soloff | 408/89 X |
| 2,860,487 | 11/1958 | Wheeler | 408/130 X |

Primary Examiner—Andrew R. Juhasz
Assistant Examiner—Z. R. Bilinsky
Attorney—Brown, Murray, Fiick & Peckham

[57] ABSTRACT

Apparatus for drilling escape and vent holes in a plurality of die molds simultaneously. The inner and outer surfaces of each die mold intersect the common drill axis of a pair of confronting, axially aligned drill means. One of the drill means is adapted to drill an escape hole through the outer mold surface and the other drill means is adapted to drill a vent hole through the inner mold surface. A mold positioning mechanism is provided to place the die molds in identical adjusted positions wherein preselected corresponding points on the die molds coincide with the common drill axes.

6 Claims, 5 Drawing Figures

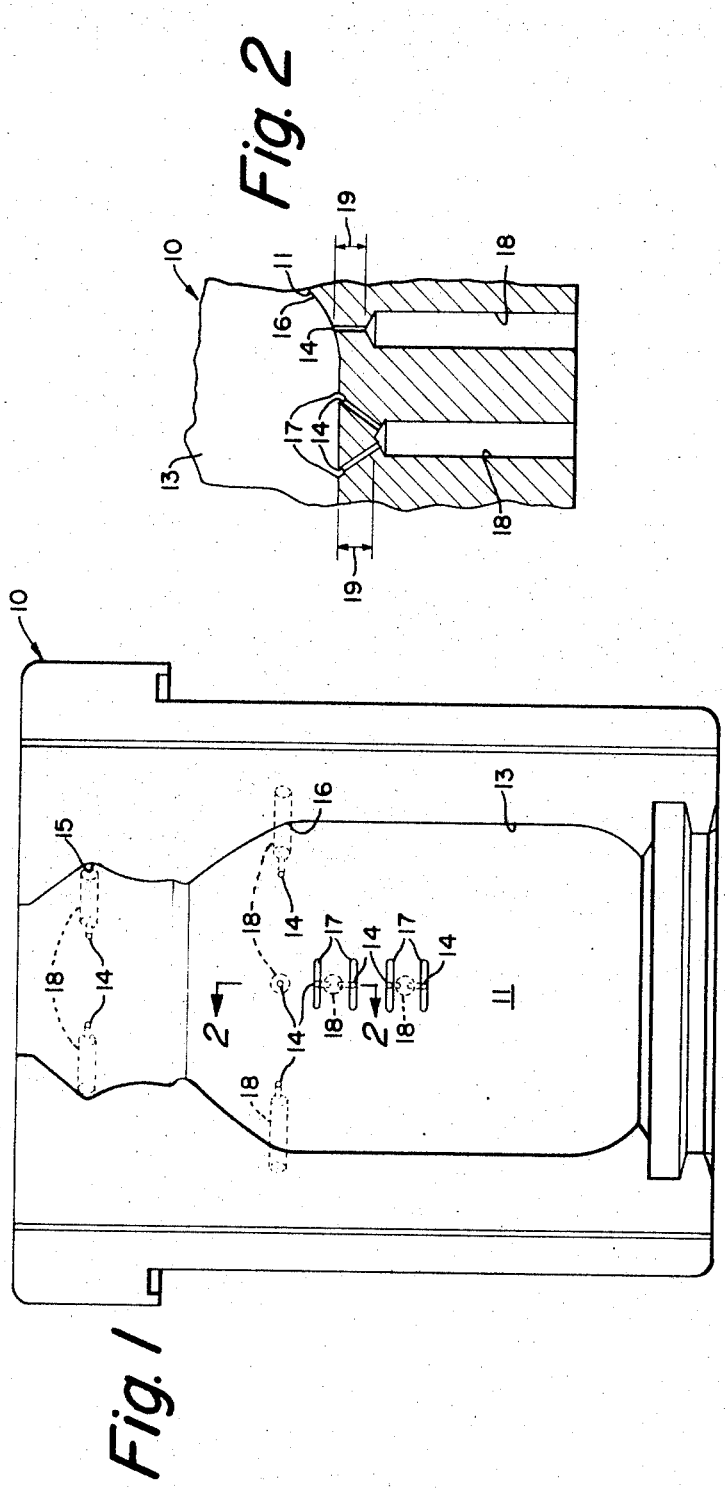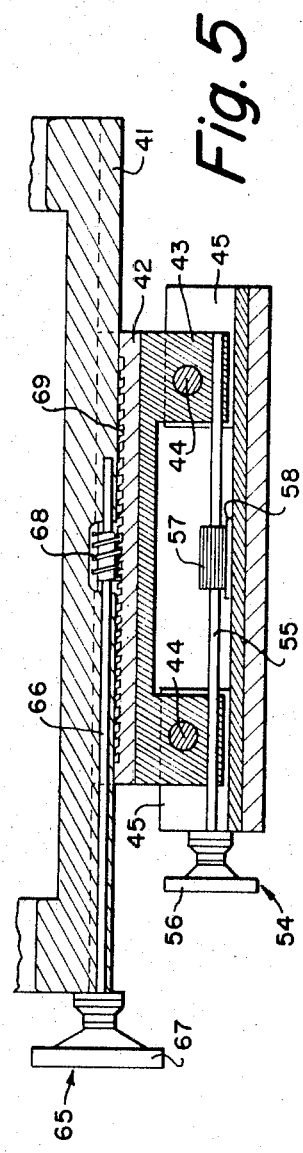

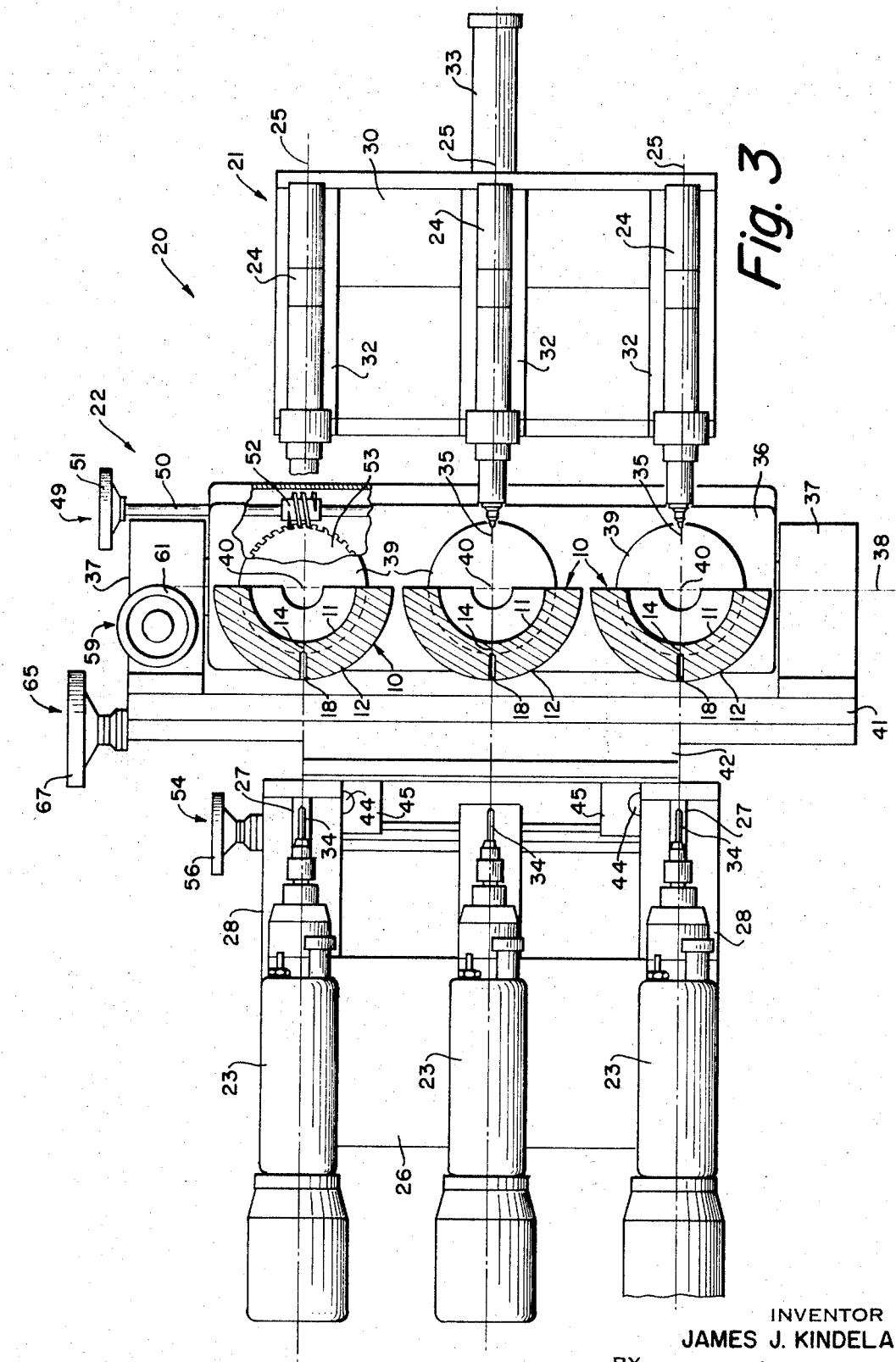

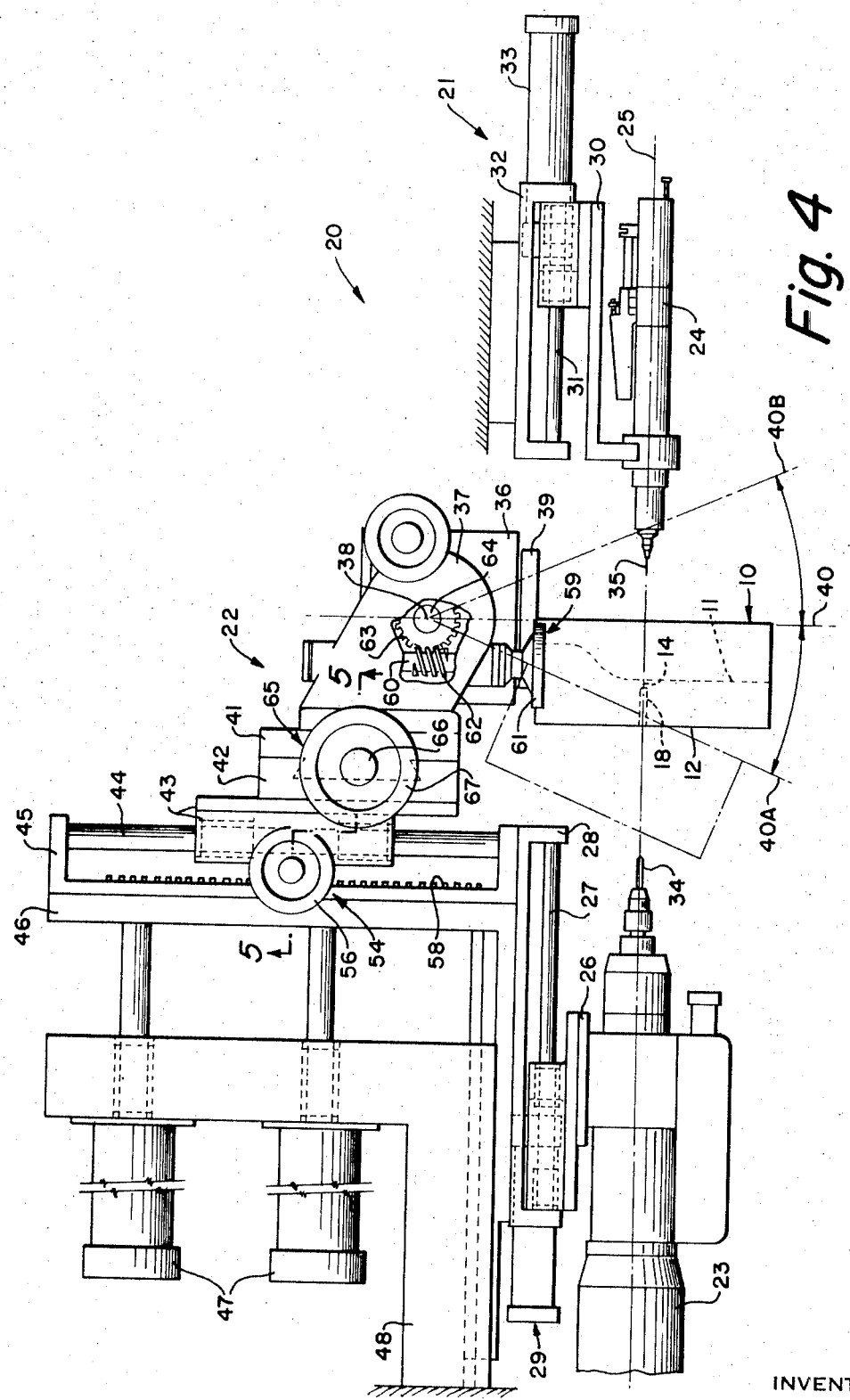

APPARATUS FOR DRILLING ESCAPE AND VENT HOLES IN DIE MOLDS

BACKGROUND OF THE INVENTION

1. Field of the Invention:

This invention relates to apparatus for drilling escape and vent holes in die molds, such as those used in the manufacture of glass and plastic containers, and more particularly to apparatus by which a plurality of die molds are drilled simultaneously.

2. Description of the Prior Art:

In the art of producing glass containers, a pair of mating die molds (mold halves) are assembled to provide a cavity having a shape corresponding to the shape of the glass container. The surfaces of the cavity may be provided with relatively simple or relatively intricate designs. In either instance, vent holes are provided through which trapped air is expelled during the production of each glass container. The vent holes include a relatively large diameter (one-fourth inch) escape hole and one or more relatively small diameter (0.005 inch to 0.028 inch) vent holes which communicate with the escape hole.

Heretofore, each die mold was manually presented at a first station wherein an escape hole was drilled and then at a second station wherein one or more vent holes were drilled which communicated with the escape hole. Each die mold underwent successive passes between the two stations until a sufficient number of escape and vent holes were provided.

The number of vent holes required depends on the intricacy of the mold design. For example, in one pair of die molds having a relatively simple mold design, one die mold was provided with 2 ¼ inch times 0.031 inch escape holes while the other die mold was provided with 47 or more ¼ escape holes. Each escape hole communicated with at least one vent hole.

It should be readily apparent that the prior method — manual positioning — of drilling escape and vent holes is a time-consuming operation. Moreover, the production rate of drilled die molds is limited.

SUMMARY OF THE INVENTION

The principal object of this invention is to provide apparatus for drilling plural escape and vent holes in die molds in a more efficient and rapid manner.

Another object of this invention is to provide apparatus for drilling escape and vent holes in a plurality of die molds simultaneously.

In accordance with this invention, apparatus is provided including a drilling mechanism and a mold positioning mechanism. The drilling mechanism comprises at least one and preferably plural pairs of first and second drill means for drilling, respectively, escape holes and vent holes. The first drill means are supported independently of the second drill means. The first and second drill means of each pair are disposed in confronting relation and aligned along a common drill axis.

The mold positioning mechanism includes a support member carrying at least one and preferably a plurality of mold halves. The surfaces of each mold half intersect one of the common drill axes. Plural adjustment means are provided to place the mold halves in identical adjusted position wherein corresponding preselected points of the mold halves coincide with the common drill axis.

In a preferred arrangement, the support member and the first drill means are moved as a unit to place the mold halves, while in their adjusted positions, in confronting relation with the second drill means. The first drill means confronts the outer surfaces of the mold halves whereas the second drill means confronts the inner surfaces of the mold halves.

The first drill means is activated, drills escape holes and is retracted. The second drill means is activated, drills vent holes and is retracted. At this time, the support member is repositioned by one or more of the plural adjustment means to place all of the mold halves in identical second positions. The drilling operation is repeated.

BRIEF DESCRIPTION OF THE DRAWINGS

FIG. 1 is a front view of a mold half provided with plural escape and vent holes;

FIG. 2 is a cross-sectional view taken along the line II—II of FIG. 1;

FIG. 3 is a front elevational view of the mold drilling apparatus of the present invention;

FIG. 4 is a plan view of the mold drilling apparatus described herein; and

FIG. 5 is a cross-sectional view taken along the line V—V of FIG. 4.

DESCRIPTION OF THE PREFERRED EMBODIMENT

FIGS. 1 and 2 illustrate a die mold or mold half 10 having inner and outer surfaces 11, 12. A bottle-shaped cavity 13 is provided in the inner surface 11. It will be understood that a matching pair of the mold halves 10 will be assembled to provide a complete bottle-shaped cavity.

As is conventional, vent holes 14 are provided at various locations in the cavity 13 to expel entrapped air during the manufacture of the bottles. For example, vent holes 14 may be provided in the neck portion 15; in the shoulder portion 16; and in each of the depressions 17. As best shown in FIG. 2, escape holes 18 are drilled from the outer face 12 to within a preselected distance 19 from the inner face 11. The preselected distance 19 may comprise, for example, one-quarter inch. Each of the escape holes 18 may communicate with one of the vent holes 14 or with a plurality of vent holes 14.

FIGS. 3 and 4 illustrate apparatus 20 of this invention. The apparatus 20 includes a drilling mechanism 21 and a mold positioning mechanism 22.

The drilling mechanism 21 comprises at least one and preferably plural pairs of first drill means 23 and second drill means 24 for drilling, respectively, escape holes 18 and vent holes 14. The first and second drill means 23, 24 of each pair are independently supported in spaced-apart confronting relation and are aligned along a common drill axis 25. For example, all of the first drill means 23 may be secured to a common carrier 26 which is movable along spaced-apart parallel rods 27 supported by cradles 28. Movement of the first drill means 23 along the common drill axes 25 toward and away from the second drill means 24 is accomplished by second motor means 29 (FIG. 4). The second motor means 29 may comprise a pneumatically operated or hydraulically operated cylinder.

All of the second drill means 14 are secured to a common carrier 30 which is movable along spaced-apart rods 31 (only one visible in FIG. 4) supported by stationary cradles 32. During a drilling operation, third motor means 33 is employed to move the second drill means 24 axially along the common drill axes 25. The third motor means 33 may comprise a pneumatically operated or hydraulically operated cylinder.

It will be observed in FIGS. 3 and 4 that each of the first drill means 23 carries a large diameter drill 34 for drilling the escape holes 18 (FIG. 2). The first drill means 23 may comprise conventional electrically operated drills. The drill 34 may have a diameter of one-quarter inch, for example. Each of the second drill means 24 carries a small diameter drill 35 for drilling the vent holes 14 (FIG. 2). The drills 35 may have a diameter in the range of from 0.016 inch to 0.028 inch. The second drill means 24 may comprise a high speed air-operated drill wherein the drill 35 is driven at a speed of about 15,000 revolutions per minute.

The mold positioning mechanism 22 comprises a support member 36 pivotally supported between spaced-apart bearing blocks 37 for pivotal movement about a longitudinal axis 38. The longitudinal axis 38 is spaced-apart from and extends transversely of the common drill axes 25. The support member 36 is provided with plural spindles 39. A mold half 10 is secured to each of the spindles 39 and is supported thereby for rotation about a longitudinal mold axis 40 (FIG. 4) extending toward the common drill axes 25. Normally, each mold axis 40 intersects one of the common drill axes 25, as shown in FIG. 3. It will be noted that the outer and inner surfaces 12, 11 of the molds 10 confront, respectively, the first and second drill means 23, 24 — the surfaces 11, 12 intersecting the common drill axes 25.

As best shown in FIG. 3, the support blocks 37 are secured to a first plate 41 which is keyed to and slideable over a second plate 42. The second plate 42 is supported by a common carrier 43 for movement along spaced-apart rods 44 presented by cradles 45.

In the preferred arrangement, the cradles 45 and the cradles 28 are secured to a common support 46 and are movable as a unit toward and away from the second drill means 24. First motor means 47 secured to a stationary support 48, are provided for moving the common support 46 in a direction parallel with the common drill axes 25.

The mold positioning mechanism 22 includes plural adjustment means by which the mold halves 10 are placed in identical adjusted positions wherein corresponding preselected points on the mold halves coincide with the common drill axes 25.

Referring in particular to FIG. 3, first adjustment means 49 is provided for rotating all of the mold halves 10 about the mold axes 40. The first adjustment means 49 may comprise, for example, a shaft 50 extending through the support member 36 and rotatable by a handwheel 51. Worm gears 52 (only one illustrated) are positioned on the shaft 50 in meshing relation with gears 53 each connected to one of the spindles 39. The overall arrangement is such that rotation of the handwheel 51 causes simultaneous rotation of the mold halves 10 in the same direction.

Referring to FIGS. 4 and 5, second adjustment means 54 is provided for moving the support member 36 reciprocally in a direction parallel to the mold axes 40 and normal to the common drill axes 25. As best shown in FIG. 5, the second adjustment means 54 may comprise, for example, a shaft 55 supported by the common carrier 43 and rotatable by a handwheel 56. A pinion gear 57 carried by the shaft 55, meshes with a rack 58 provided in the cradle 45. It will be observed in FIG. 4 that by rotating the handwheel 56 in the appropriate direction, the mold 10 will be moved in a direction normal to the common drill axes 25.

Referring to FIGS. 3 and 4, third adjustment means 59 is provided for pivoting the support member 36 about the longitudinal pivot axis 38 to thereby incline the mold axes 40 relative to the common drill axes 25. In FIG. 4, the mold 10 is illustrated with its mold axis 40 extending normal to the common drill axes 25. The third adjustment means 59 operates to position the mold axis at either of the extreme incline positions indicated by the dash-dot lines 40A and 40B and at positions therebetween.

As shown in FIG. 4, the third adjustment means 59 may comprise, for example, a shaft 60 carried by one of the bearing blocks 37 and having a handwheel 61. The shaft 60 carries a worm gear 62 which meshes with a spur gear 63. The spur gear 63 is secured to a shaft 64 which pivotally supports the support member 36. Appropriate rotation of the handwheel 61 will position the mold axes 40 of all of the mold halves 10 at the desired incline position with respect to the common drill axes 25.

It should now be apparent that the first, second and third adjustment means 49, 54 and 59, respectively, cooperate to place the mold halves 10 in identical adjusted positions wherein preselected corresponding points of the mold halves 10 coincide with the common drill axes 25. Most of the escape holes and vent holes may be drilled using only these three adjustment means.

Occasionally, it is desired to displace the mold axes 40 to either side of the common drill axes 25 in order to gain access to a relatively inaccessible area of the mold half. To this end, the present apparatus 20 may be provided with fourth adjustment means 65 for moving the support member 36 reciprocally in a direction which is normal to the common drill axes 25 and which is normal to the direction of movement provided by the second adjustment means 54. As best illustrated in FIG. 5, the fourth adjustment means 65 may comprise, for example, a shaft 66 supported by the first plate 41 and having a handwheel 67. The shaft 66 carries a worm gear 68 meshing with a rack gear 69 presented by the second plate 42. It should be readily apparent from a comparison of FIGS. 3 and 5, that rotation of the handwheel 67 will displace the mold axes 40 from their normal intersecting relation with the common drill axes 25.

Since the vent holes 14 and/or the escape holes 18 are occasionally drilled at an angle relative to the surfaces 11, 12, it may be desirable to provide each of the drills 34, 35 with a conventional drill support (not illustrated). The drill supports will prevent the drills 34, 35 from wandering and breaking during angular drilling.

As described above, the escape holes 18 are drilled to within a preselected distance 19 (FIG. 2) of the inner mold surface 11. A conventional adjustable drill stop (not illustrated) may be provided to limit the drilling depth of the escape hole drill 34.

In FIGS. 3 and 4, the apparatus 20 is oriented with the mold halves vertically aligned and with the drill means 23, 24 horizontal. It should be evident that the apparatus 20 may be oriented with the drill means 23, 24 vertically aligned in which case the mold halves would be horizontal.

Manual operation of the apparatus 20 has been described. It should be evident that the apparatus 20 may be modified for automatic operation. Suitable automatic control systems are known and may be incorporated into the present drilling apparatus 20. Such control systems employ punch-type cards or magnetic tape on which the position coordinate information for each drilling operation may be recorded. During automatic operation of the apparatus 20, all of the molds halves 10 are moved simultaneously and successively into each recorded position. At each position, escape and vent holes are drilled.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for drilling communicating escape and vent holes in a mold half, said apparatus including:
   a drilling mechanism comprising
   at least one pair of first and second drill means for drilling, respectively, an escape hole and a vent hole, said first and second drill means being independently supported in spaced-apart confronting relation and aligned along a common drill axis;
   a mold positioning mechanism comprising
   a support member,
   at least one mold half supported on said support member for rotation about a longitudinal mold axis extending toward said common drill axis, said mold half presenting outer and inner faces which confront, respectively, said first and second drill means,
   first adjustment means for rotating said mold half about said mold axis, and
   second adjustment means for moving said support member reciprocally in a direction parallel to said mold axis and normal to said common drill axis,
   said first and second adjustment means cooperating to place said mold half in an adjusted position wherein a preselected point of said mold half coincides with said common drill axis;
   first motor means for moving said support member with said mold half in said adjusted position, to place said mold half in confronting relation with one of said drill means;
   second motor means for moving the other of said drill means axially into drilling engagement with said mold half,
   means for supporting said support member for pivotal movement about a pivot axis extending transversely of and spaced apart from said common drill axis; and
   third adjustment means for pivoting said support member about said pivot axis to thereby incline said mold axis with respect to said common drill axis.

2. The apparatus defined in claim 1 wherein said mold axis intersects said common drill axis.

3. Apparatus for drilling communicating escape and vent holes in plural mold halves, said apparatus including
   a drilling mechanism comprising
   plural first drill means supported in laterally spaced-apart parallel relation for drilling escape holes,
   plural second drill means supported in laterally spaced-apart parallel relation independently of said first drill means for drilling vent holes,
   each of said first drill means being aligned along a common drill axis with a corresponding one of said second drill means and being axially spaced apart therefrom,
   a mold positioning mechanism comprising
   a support member,
   plural mold halves supported on said support member for rotation about spaced-apart parallel longitudinal mold axes each extending toward one of said common drill axes, each of said mold halves presenting outer and inner faces which confront, respectively, corresponding first and second drill means, said mold halves having identical orientations with respect to said first drill means,
   first adjustment means for rotating said mold halves in unison about said mold axes, and
   second adjustment means for moving said support members reciprocally, in a direction parallel with said mold axes and normal to said common drill axes,
   said first and second adjustment means cooperating to place all of said mold halves in identical adjusted positions wherein preselected corresponding points of said mold halves coincide with said common drill axes;
   first motor means for moving said support member with said mold halves in said identical adjusted positions to place each of said mold halves in confronting relation with one of said drill means; and
   second motor means for moving the other of said drill means axially into drilling engagement with said mold halves.

4. The apparatus defined in claim 3 including
   means for supporting said support member for pivotal movement about a pivot axis extending transversely of and spaced apart from said common drill axes; and
   third adjustment means for pivoting said support member about said pivot axis to thereby incline all of said mold axes with respect to said common drill axes.

5. The apparatus defined in claim 3 including fourth adjustment means for moving said support member reciprocally, in a direction which is normal to said common drill axes and which is normal to the direction of movement provided by said second adjustment means, to thereby displace said mold axes laterally of said common drill axes.

6. Apparatus for drilling communicating escape and vent holes in a mold half, said apparatus including:
   a drilling mechanism comprising
   at least one pair of first and second drill means for drilling, respectively, an escape hole and a vent hole, said first and second drill means being independently supported in spaced-apart
   a mold positioning mechanism comprising
   a support member,
   at least one mold half supported on said support member for rotation about a longitudinal mold axis extending toward said common drill axis, said mold half presenting outer and inner faces which confront, respectively, said first end second drill means, first adjustment means for rotating said mold half about said mold axis, and second adjustment means for moving said support member reciprocally in a direction parallel to said mold axis and normal to said common drill axis, said first and second adjustment means cooperating to place said mold half in an adjusted position wherein a preselected point of said mold half coincides with said common drill axis; and first motor means for moving said support member with said mold half in said adjusted position, to place said mold half in confronting relation with one of said drill means;

second motor means for moving the other of said drill means axially into drilling engagement with said mold half, and fourth adjustment means for moving said support member reciprocally in a direction which is normal to said common drill axis and which is normal to the direction of movement of said second adjustment means, whereby said mold axis is displaced laterally of said common drill axis.

* * * * *